Figure 3:
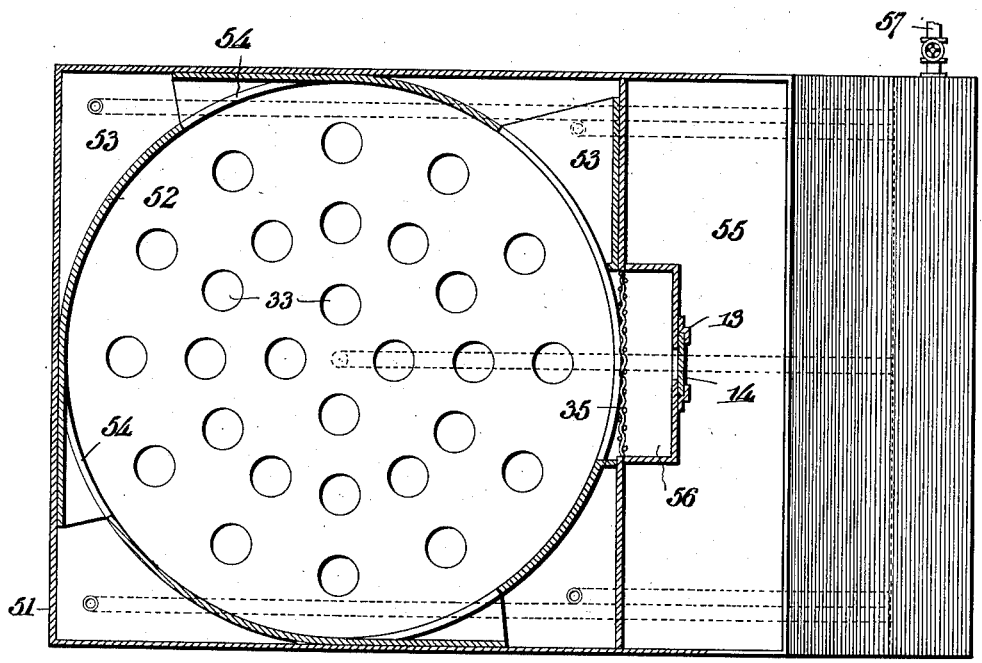

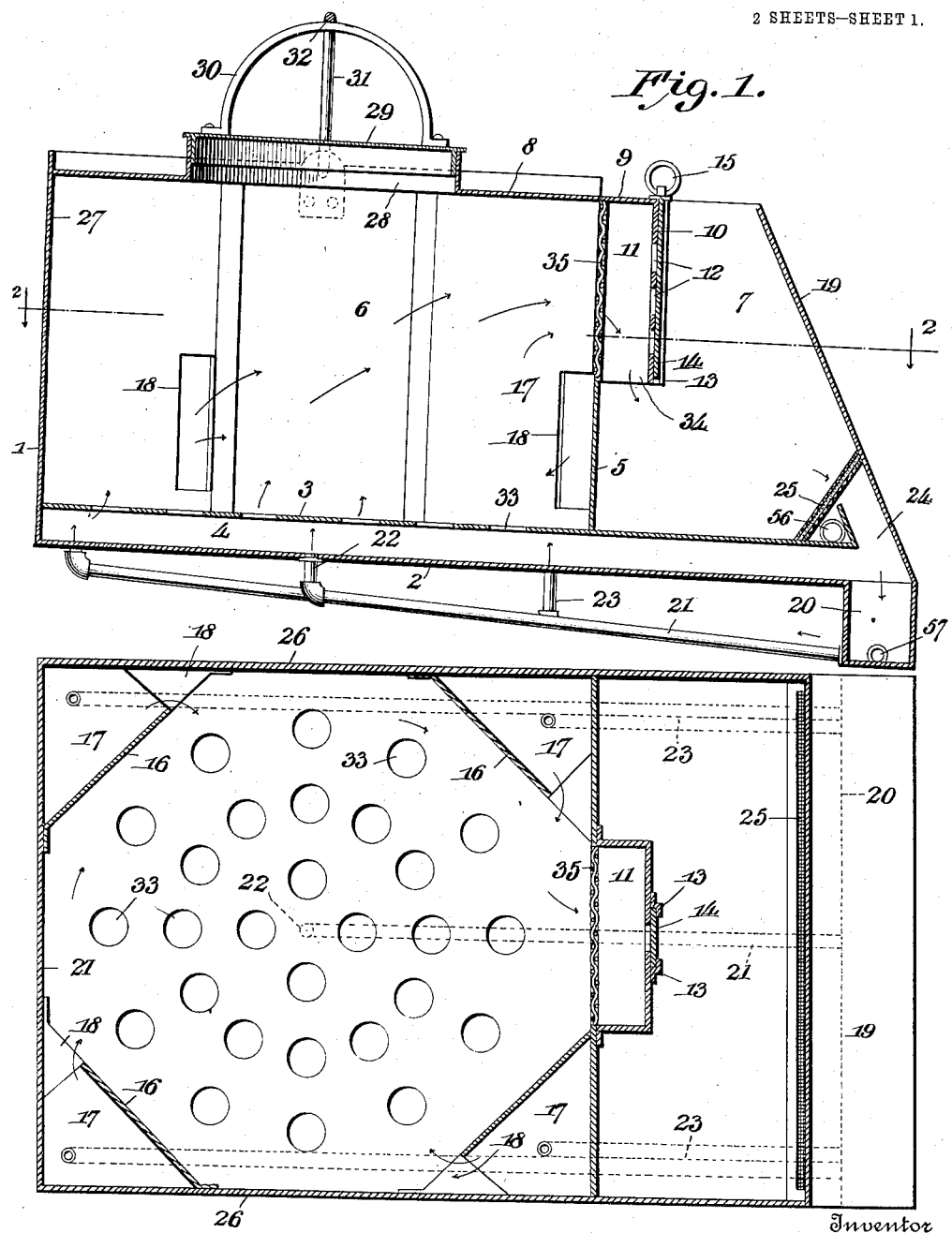

G. W. CONNOR.
WASHING APPARATUS.
APPLICATION FILED SEPT. 23, 1911.

1,034,206.

Patented July 30, 1912.

2 SHEETS—SHEET 2.

Witnesses

Inventor
George W. Connor.
By Victor J. Evans
Attorney

UNITED STATES PATENT OFFICE.

GEORGE W. CONNOR, OF BEARWALLOW, NORTH CAROLINA.

WASHING APPARATUS.

1,034,206.　　　　Specification of Letters Patent.　　Patented July 30, 1912.

Application filed September 23, 1911. Serial No. 650,876.

*To all whom it may concern:*

Be it known that I, GEORGE W. CONNOR, a citizen of the United States, residing at Bearwallow, in the county of Henderson and State of North Carolina, have invented new and useful Improvements in Washing Apparatus, of which the following is a specification.

This invention relates to washing apparatus and particularly to an improvement over my prior Patent Number 999,096, dated July 25, 1911.

One object of the invention is to provide means for promoting the circulation of steam, suds and hot water through or over the articles to be washed and thereby effect the rapid and thorough cleaning of the articles.

Another object of the invention is to provide a filtering agent which will be disposed in the circulating path of the water to collect from the water the dirt or foreign matter and thereby prevent such matter from escaping into the suds or cleaning chamber of the apparatus during the boiling or washing operation.

Another object of the invention is to provide washing apparatus which will be constructed so as to permit of its being thoroughly cleaned and sterilized.

A still further object of the invention is to provide a water sealed trap separating the communicating water circulating compartments from each other and valved means in the trap to permit of the initial discharge or escape of the steam from the suds chamber to the outside air when it is desired to remove the covering from the suds chamber and thereby prevent the hot water or steam from coming in direct contact with the operator when removing the top.

In the drawings, forming a portion of this specification and in which like numerals of reference indicate similar parts in the several views:—Figure 1 is a vertical section through the apparatus. Fig. 2 is a horizontal section taken on line 2—2 of Fig. 1. Fig. 3 is a view similar to Fig. 2 showing a modified form of the invention.

In the preferred embodiment of the invention which is disclosed in Figs. 1 and 2 of the hereunto annexed drawings, the apparatus comprises a receptacle 1 which is provided with a main bottom 2 and a supplemental bottom 3, the bottoms 2 and 3 being spaced from each other to form an intervening lower circulating chamber 4. A vertical partition 5 divides the receptacle into a suds chamber 6 and a chamber 7. The top 8 of the suds chamber is extended beyond the partition 5, as at 9, and then downwardly, at 10, so as to define a trap 11 in the compartment 7. The portion 10 of the trap is provided with a vertical series of passages 12 and movable across the passages and mounted in the guides 13 on the portion 10 is a valve or regulating plate 14. This plate is provided at its upper end with a ring or manipulating portion 15 by means of which the plate can be moved to open or close the openings 12.

The suds chamber 6 of the apparatus is provided therein with vertical partitions 16 which, in effect, form baffles for a purpose to be hereinafter described. These baffles extend across the corners of the suds chamber and they are arranged or disposed with relation to the walls of the suds chamber to define therewith auxiliary compartments 17. Each baffle-forming partition is provided therein with an opening 18 by means of which communication between the auxiliary compartments and the suds chamber is established.

The front wall 19 of the receptacle 1 extends downwardly and forwardly and it is continued into the front wall of a transverse trough 20 at the bottom of the receptacle. This trough is connected with a pipe 21 which extends beneath the receptacle 1 and which opens at one of its ends into the chamber 4, as shown at 22. Similar pipes 23 connect the trough 20 with the auxiliary compartments 17. The front of the supplemental bottom 3 is spaced, at 24, from the front wall 19 of the washing receptacle so that communication will be established between the space 4 and the compartment 7. A filtering element 25 is disposed in the circulating course of the boiling water, and as shown, this element extends entirely across the receptacle and is disposed in the compartment 7 at a point above the opening 24 or communicating space between the compartment 7 and the space 4.

The side walls 26 and the end wall 27 are extended upwardly above the top 8 so as to form an effective guard flange around the filling opening 28 of the receptacle 1. This construction is such that any water accumulating upon the top 8 will be free to pass downwardly and forwardly in the direction of the compartment 7 where it will be discharged. The opening 28 is provided with a removable cover 29. This cover has secured thereto a curved handle 30 by means of which the cover can be readily removed from or inserted into the opening. With a view of preventing the cover from accidentally opening during the boiling operation, I provide a bail 31. This bail is pivoted to the side walls of the receptacle 1 and it is so constructed that it may be adjusted to cause its portions 32 to be disposed immediately above the handle 30 but sufficiently in contact therewith to hold the cover tight in the opening. The supplemental bottom 3 is provided with one or more passages 33, whereby the proper communication between the suds chamber and the space 4 is made.

In operation, water is placed in the receptacle so that the lower open end 34 of the trap 11 will be sealed by that water in the compartment 7. The apparatus is then placed upon a stove or furnace and arranged thereon so that the bottom of the receptacle will extend upwardly and rearwardly at an angle from the front of the stove so that the bottom presents a very large heating surface. Now, incident to the fact that the water will be confined in the suds chamber 6, it will obviously appear that this water at all times remains hotter than the water in the compartment 7. When the water reaches the boiling point the steam will be discharged upwardly through the supplemental bottom and into the suds chamber and also into the subcompartments 17. As previously stated, the partitions 16 of the subcompartments form baffles or deflectors and incident thereto the steam and hot water entering such compartment will be forced into the suds compartment. The water agitated during the boiling process and disturbed incident to the peculiar discharge of the water from the subcompartments into the suds chamber will describe substantially a circulatory path. The hot water as it rises to the surface will be discharged into the trap 11 by way of the foraminous covering 35, forcing the water in the compartment 7 through the filtering agent 25 and then back through the space 4 and the pipes 21 and 23, thereby completing a continuous circulation of the water. It will of course be understood that the clothes or articles to be washed are first to be slightly soaped. They are then put into the suds chamber and the cover of the chamber is securely closed. Impurities or foreign matter which may be carried into the chamber 7 with the water in its circulation will be collected and positively retained by the filtering agent. When it is desired to remove the washed clothes or articles from the suds chamber it is desirable, with a view of preventing one from being scalded by the steam to adjust the valve plate 14 to either a partly or full open position. This permits the steam in the suds chamber to escape through the trap 11 and to the outside atmosphere. The cover 29 can then be removed without liability of the operator being injured through the steam or scalding water which might otherwise be forced from the apparatus. The form of the washing apparatus described in the foregoing is designed desirably for use as a clothes washer, it being obviously understood, however, that I do not desire to limit myself to such use as such structure is very capable of innumerable obvious uses.

In the modified form of the invention shown in Fig. 3 is shown a receptacle 51. The configuration of this receptacle is substantially the same as the receptacle described in the form of the invention shown in Figs. 1 and 2. In this form the suds chamber is provided with a baffle 52 of circular configuration. This baffle is arranged with respect to the corners of the suds chamber so as to form therewith the subchambers or compartments 53 which are similar to the compartments 17 hereinbefore described. Openings 54 in the baffle 52 establish communication between the suds chamber and the subcompartments 53. The compartment 55 is similar to the compartment 7 and the trap 56 is also similar to the trap 11, therefore it is believed that further detailed description is unnecessary. In each form of the invention the receptacle is provided with one or more suitable draw-offs 57, whereby the dirty water can be drained from the apparatus. While the member 25 is employed principally for the purpose of purifying the circulating water it will also assist admirably in preventing grease or like substances from clogging the openings 33 in the supplemental bottom of the receptacle.

I claim:—

1. Washing apparatus comprising a receptacle having communicating compartments therein, a supplemental bottom spaced from the main bottom of the receptacle and defining therewith a longitudinally disposed circulating chamber which opens at one end into one of the compartments and which also opens vertically intermediate of its ends into the other compartment, and subcompartments opening at their lower ends into the said circulating chamber of the receptacle and opening radially into one of the first compartments.

2. Washing apparatus comprising a receptacle having a suds chamber therein, the said receptacle being provided, in open communication with the said suds chamber, with a second chamber, and a trap in the second chamber adapted to be closed by the water in said second chamber, and provided with a valve adapted to be operated to establish communication between the outside air and the said suds chamber.

3. Washing apparatus comprising a receptacle having a suds chamber therein, the said receptacle being provided, in open communication with the said suds chamber, with a second chamber having an open upper end, a trap in the second chamber adapted to be closed by the water in said second chamber, and a valve located in the trap for establishing communication between the same and the outside air.

4. Washing apparatus comprising a receptacle having a suds chamber therein, the said receptacle being provided, in open communication with the said suds chamber, with a second chamber, a trap in the second chamber, a trap in the second chamber adapted to be closed by the water in said second chamber and having a foraminous side, a valve slidably engaged against the said foraminous side, and a supplemental bottom spaced from the main bottom of the receptacle and defining therewith a longitudinal water circulating space which opens vertically into the first chamber and which also opens at one end into the second chamber.

5. Washing apparatus comprising a receptacle having a suds chamber therein, the said receptacle being provided in open communication with the said suds chamber, with a second chamber, a trap in the second chamber adapted to be closed by the water in said second chamber, a supplemental bottom spaced from the main bottom of the receptacle and defining therewith a longitudinal water circulating space which opens vertically into the first chamber and which also opens at one end into the second chamber, and a filtering member disposed in the water circulating course between the first and second chambers and the longitudinal circulating space.

6. Washing apparatus comprising a receptacle having a suds chamber therein, the said receptacle being provided, in open communication with the said suds chamber, with a second chamber, a trap in the second chamber adapted to be closed by the water in said second chamber, a supplemental bottom spaced from the main bottom of the receptacle and defining therewith a longitudinal water circulating space which opens vertically into the first chamber and which also opens at one end in the second chamber, a filtering member disposed in the water circulating course between the first and second chambers and the longitudinal corculating space, and compartments opening radially into the first chamber and opening vertically onto the main bottom of the receptacle.

7. Washing apparatus comprising a receptacle including a suds chamber and a trapping chamber, a removable closure for the suds chamber the said chambers being arranged in open communication and the trapping chamber having a foraminous portion, and a valve movable across the foraminous portion, whereby the trapping chamber can be arranged in open communication with the outside air to permit of the initial discharge of the steam from the apparatus prior to the removal of the said cover from the suds chamber.

8. Washing apparatus comprising a receptacle having suds and trapping chambers respectively, the said chambers being arranged in horizontal and vertical communication with each other, a trough disposed beneath the receptacle and opening into the trapping chamber, a filtering agent extending across one end of the trough and pipes extending from the trough and opening into the suds chamber.

9. Washing apparatus comprising a receptacle having suds and trapping chambers respectively, the said chambers being arranged in horizontal and vertical communication with each other, a trough disposed beneath the receptacle and opening into the trapping chamber, compartments located in the suds chamber and opening radially thereinto, and pipes extending from the trough and having discharge ends disposed beneath the compartments and trapping chamber respectively.

In testimony whereof I affix my signature in presence of two witnesses.

GEORGE W. CONNOR.

Witnesses:
  JAMES KOEHL,
  BENNETT S. JONES.